United States Patent [19]

Farrell

[11] 4,012,187

[45] Mar. 15, 1977

[54] INJECTION BLOW MOLDING WITH PRELIMINARY INJECTION BLOW MOLD

[75] Inventor: John J. Farrell, Green Brook, N.J.

[73] Assignee: Farrell Patent Company, Green Brook, N.J.

[22] Filed: Apr. 12, 1976

[21] Appl. No.: 676,108

Related U.S. Application Data

[63] Continuation of Ser. No. 518,185, Oct. 25, 1974, abandoned.

[52] U.S. Cl. .................. 425/242 B; 425/DIG. 209; 425/DIG. 215
[51] Int. Cl.² ........................................ B29C 17/07
[58] Field of Search ........ 425/242 B, 324 B, 387 B, 425/388, DIG. 209, DIG. 215; 264/97

[56] References Cited

UNITED STATES PATENTS

| 3,345,687 | 10/1967 | Marx | 425/249 X |
| 3,709,644 | 1/1973 | Farrell | 425/160 |

Primary Examiner—Richard B. Lazarus
Attorney, Agent, or Firm—Marvin Feldman

[57] ABSTRACT

This improvement in injection blow molding apparatus applies means for blowing a parison while it is still in an injection mold cavity and after sucking back a small portion of the injected material. The possible blowing is very slight, but it causes the parison to remain in contact with the injection mold cavity wall as it shrinks and draws away from much of the surface of the core rod to which the parison is applied by the injection process. This prevents parisons from sticking to the core rod and producing non-uniform results during the subsequent blowing operation in the blowing mold.

6 Claims, 6 Drawing Figures

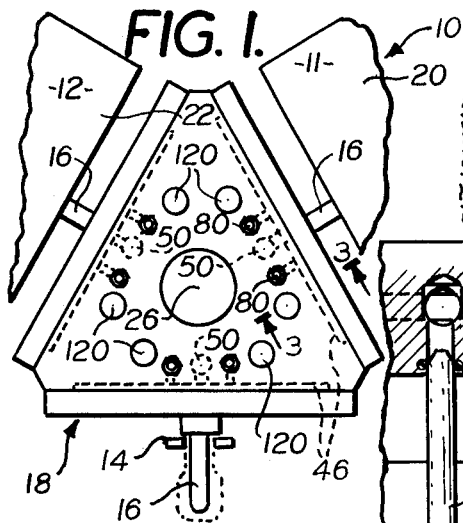
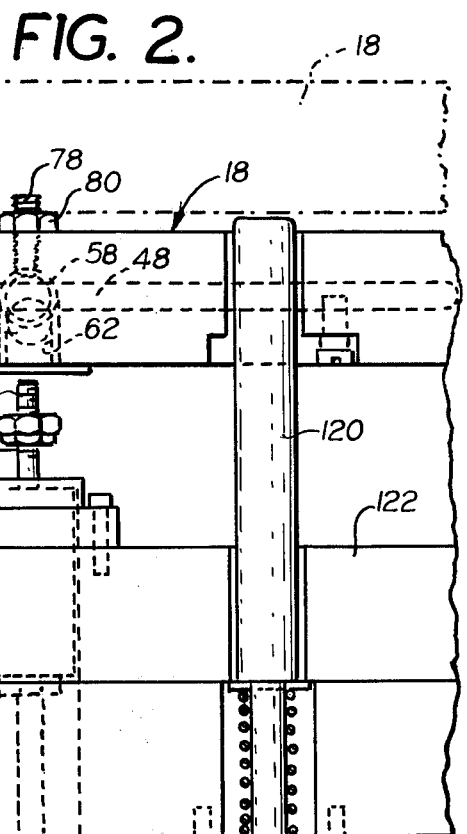
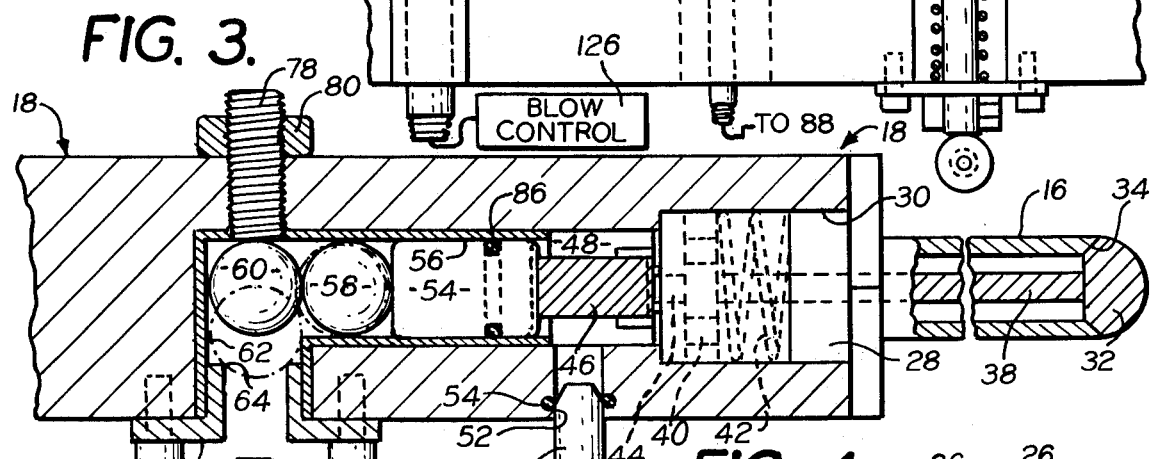
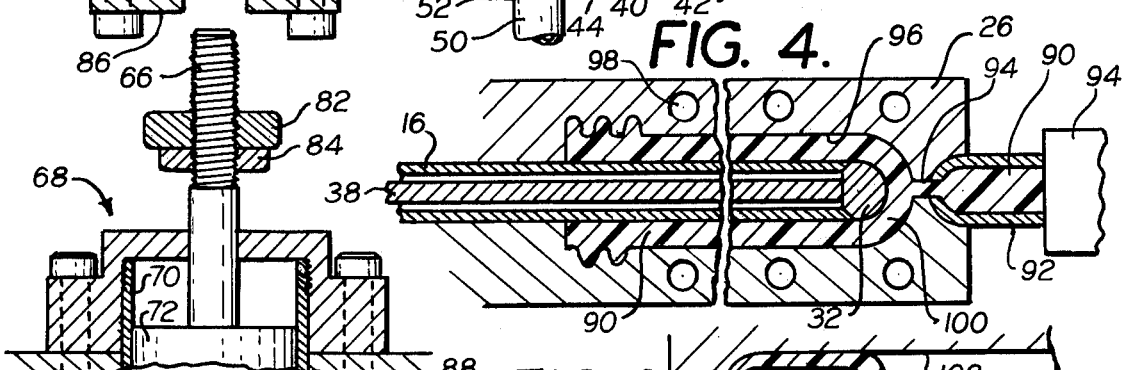
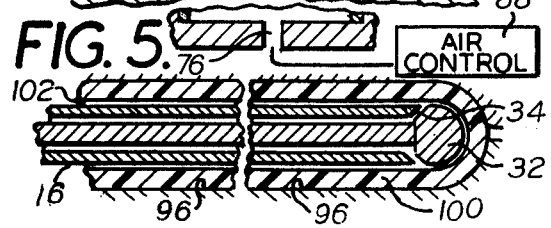
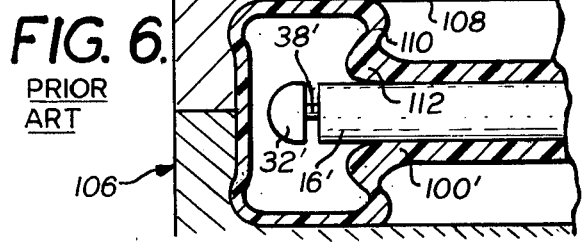

INJECTION BLOW MOLDING WITH PRELIMINARY INJECTION BLOW MOLD

This is a continuation of application Ser. No. 518,185, filed Oct. 25, 1974 and now abandoned.

BACKGROUND AND SUMMARY OF THE INVENTION

Injection blow molding machines apply a parison to a core rod by injecting molten plastic material into the cavity of an injection mold into which a core rod extends. The plastic material coats the core rod and fills the mold cavity clearance that exists between the outside surface of the core rod and the wall of the injection cavity.

In accordance with standard operating procedure, the pressure on the injected plastic material is then reduced and a negative pressure or suction is then applied to draw back some of the plastic from the runners of the injection mold.

The wall of each injection cavity is cooled by the circulation of cooling fluid through the cavity walls and this cooling causes the parison to cool and shrink away from the cavity walls.

When the core rod and parison are transferred to a blow molding cavity, it is essential that the parison release easily and uniformly from the surface of the core rod in order to blow an object of the desired uniform wall thickness. In spite of the compounding of the plastic material and the smooth surfaces on the core rods, parisons do stick to core rods on occasions and this can cause defective articles. Such results require inspection of the output of the blow molding machine and result in wasted material, time, and production.

This invention provides a blowing fluid under pressure which is applied through the core rod and into the interior of the parison while the parison is still located in the cavity of the injection mold. Since the cavity is filled with molten plastic by the injection operation, there is no space into which the parison can expand in response to the application of fluid pressure to the inside of the parison, except such clearance as develops as the result of shrinkage of the plastic in the cavity. This shrinkage occurs as the molten plastic begins to cool.

Plastics have a high coefficient of thermal expansion; and when pressure is maintained within the parison during the shrinkage of the plastic material of the parison, the parison remains in contact with the wall of the injection mold cavity and shrinks away from the surface of the core rod.

Although, theoretically, the blowing fluid may push the parison away from the entire surface area of the core rod, the core rod is the only support for the parison as it is removed from the injection mold and shifted to a blowing mold or some other treating station. Thus the parison remains in contact with the top portion of the core rod during its transport to the next performance station; but the blowing operation which causes shrinkage away from the core rod leaves the parison loose on the core rod as it travels to the blowing station or other performance station.

Since any sticking of the parison to the core rod is eliminated more uniform results are obtained in the subsequent blowing operation.

Another advantage is that the parison remains in contact with the cooled wall of the injection mold cavity as the parison shrinks; and the air which is injected into the parison insulates the parison from the core rod which is at high temperature. The parison remains in contact with the core rod for a shorter time and this reduces heat buildup in the core rods.

One of the limitations on the speed at which injection blow molding apparatus can operate is the building up of heat in the core rods. By reducing heat buildup in the core rod, this invention permits the blow molding apparatus to operate at higher production speeds.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic top plan view of injection blow molding apparatus;

FIG. 2 is a greatly enlarged sectional view taken on the line 2—2 of FIG. 1;

FIG. 3 is a greatly enlarged sectional view taken on the line 3—3 of FIG. 1;

FIG. 4 is a fragmentary sectional view, on a greatly enlarged scale, through the injection mold shown in FIG. 1 and illustrating the plastic material in the mold cavity at the time of the high pressure injection;

FIG. 5 is a fragmentary view, similar to FIG. 4, but showing the way in which the parison shrinks away from the core rod while maintaining contact with the cooled walls of the injection mold cavity; and FIG. 6 is an illustration showing the problem presented by sticking of a parison to the core during a blowing operation.

DESCRIPTION OF PREFERRED EMBODIMENT

FIG. 1 is a fragmentary, diagrammatic view of injection blow molding apparatus 10 which includes an injection station 11; a blowing station 12 and a stripper station 14. Core rods 16 projecting from faces of an indexing head 18 are moved by the indexing head to successive stations as the apparatus operates.

Indexing head 18 is shown with three faces angularly related to one another at angles of 120° and the operational stations 11, 12 and 14 are positioned in the same 120° angular relation to one another. Thus, with the indexing head 18 in the position shown in FIG. 1, one of the core rods projects into an injection mold 20; another of the core rods 16 projects into a blowing mold 22; and the third core rod 16 is shown at the stripper station 14. Ordinarily an indexing head has a plurality of core rods extending from each face and FIG. 1 shows only a single core rod for purposes of simpler illustration. It will be understood that other core rods can project from the indexing head 18 in parallel relation to those shown for each successive face.

As blow molding apparatus is ordinarily oriented, FIG. 1 is a top plan view and the indexing head 18 moves intermittently around an axis 26 through successive angles of 120° to carry each core rod from one operational station to the next. A parison is applied in the core rod 16 in a cavity of the injection mold 20. The mold then opens, the indexing head 18 rises enough to clear the lower half of the mold; the indexing head rotates 120° and then lowers to bring the core rod and parison into position over the lower part of the blowing mold. The blowing mold then closes on the core rod which has been transferred from the injection mold; and the injection mold 20 closes on another core rod 16 which has been transferred from the stripper station 14 to the injection mold 20. The construction described thus far is conventional; and no further description of the ordinary construction and operation of an injection blow molding machine is necessary for a complete understanding of this invention.

The novelty of this invention is that whereas conventional machines supplied air to the core rod at the blowing station 12, this invention provides air to the core rods at the injection station 11 also.

FIG. 3 shows one of the core rods 16 with a hub 28 which fits into a socket 30 in the face of the indexing head 18. The core rod 16 has a valve element 32 at the end of the core rod which is remote from the indexing head 18. This valve 32 seats on a tapered seat 34 at the end of the hollow sleeve portion of the core rod 16. The core rod 16 is secured to the indexing head 18 by face plates 36 which are detachably connected to the face of the indexing head by detachable fastening means which are not shown but which are conventional.

A push rod 38 is attached at one end to the valve 32 and the other end of the push rod 38 extends through the hub 28, in which it slides as a bearing, and extends beyond the hub 28 to a flange 40 which is attached to the rod 38. A compression spring 42 is confined between the flange 40 and the hub 28. The pressure of this spring 42 holds the valve 32 closed against the seat 34.

An extension 44 projects beyond the flange 40 and into contact with a trigger bar 46. There is a trigger bar 46 behind each face of the indexing head 18 in position for operating valves 32 on all of the core rods that project from each face of the indexing head. The extent of these trigger bars 46 is shown in dotted lines in FIG. 1.

Referring again to FIG. 3, the trigger bar 46 is located in a chamber 48, and when the indexing head 18 is in its lowered position, which locates the core rod in working relation with the molds, there is an air pipe 50 which communicates with the chamber 48.

The air pipe 50 is at a fixed location and when the indexing head moves into its lowered position, a passage 52 in the bottom face of the indexing head telescopes over the air pipe 50. There is an O-ring 54 in the wall of the passage 52 for sealing the running clearance between the air pipe 50 and the passage 52.

The trigger bar 46 is operated by a motion-transmitting element 54' located in a guideway 56. A ball bearing 58 is in the guideway 56 immediately behind the element 54. There is a similar ball bearing 60 located immediately beyond the ball bearing 58 in a passage 62 which opens downwardly through the bottom of the indexing head 18. The ball 60 drops by gravity into contact with a seat 64 in the passage 62.

When the ball 60 is in the dotted line position, shown in FIG. 3, in contact with the seat 64, the other ball 58 moves to the left, in FIG. 3, under pressure from the spring 42.

When the indexing head 18 moves into its lowered position, the lower end of the passage 62 telescopes over a shaft 66 of an actuator 68. This actuator 68 includes a cylinder 70 and a piston 72 connected to the lower end of the shaft 66 which serves as a piston rod.

When air is supplied through a port 76 in the lower end of the cylinder 70, the piston 72 moves upward and thrusts the upper end of the shaft 66 into contact with the ball bearing 60.

Upward movement of the ball 60 displaces the ball 58 towards the right in FIG. 3 and this causes the element 54 to move toward the right and to displace the trigger bar 46 in the same direction. The trigger bar displaces the push rod 38 of the core rod 16; and also displaces the corresponding push rods of all of the other core rods extending from the some face of the indexing head.

This displacement of the push rod 36 moves the valve 32 away from the seat 34 far enough to permit air to escape around the periphery of the valve 32.

The balls 58 and 60 together with the element 54 constitute motion-transmitting means for transmitting motion of the actuator 68 to the trigger bar 46 and to the core rod valve 32. In order to prevent the ball 40 from moving above the maximum diameter of the ball 58, a stop screw 78 is threaded through the top of the indexing head 18 and secured in its adjusted position by a lock nut 80.

Upward movement of the shaft 66 is limited by a nut 82 threaded over the upper portion of the shaft 66. This nut 82 can be locked in any adjusted position by a lock nut 84. The top nut 82 comes in contact with a face 86 on the lower side of the indexing head 18 to limit upward travel of the shaft 66. Thus the displacement of the ball 60 by the actuator 68 can be adjusted to a travel less than the maximum travel of the ball 60, as determined by the stop screw 78. This permits very accurate adjustment of the clearance between the valve 32 and the valve seat 34 so as to control the rate at which air can escape from the inside of the core rod and across the valve seat 34.

The air which flows from the core rod is supplied to the indexing head through the air pipe 50 which communicates with the chamber 48. There is a sealing ring 86 on the element 54 for preventing leakage of air from the chamber 48 through the guideway 56. The air in the chamber 48 can flow freely through the flange 40 and along the clearances around the circumference of the push rod 38. The spring 42 is strong enough to hold the valve 32 against the seat 34 and thus prevent air flow from the core rod except when the actuator 68 transmits its force through the motion-transmitting connections, already discribed, to the shaft 38 and valve 32.

The operation of the actuator, to instigate flow of air from the core rod 16, is timed by an air control 88 which is part of the programming apparatus of the injection blow molding machine. This programming apparatus controls the opening and closing of the molds, the upward and downward movement of the indexing head, and the intermittent angular movement of the indexing head as well as the supplying of air to the blowing mold. Such programming apparatus is part of any conventional blow molding machine and the actuator 68 of the present invention is tied in with the programming apparatus.

FIG. 4 shows the core rod 16 located in the injection mold 26 and with the mold closed. Plastic material 90 is injected into the mold 26 from a nozzle 92 of a plasticizer 94. This plastic 90 flows through a runner 94 into an injection mold cavity 96 which is filled up by the plastic 90 all around the core rod 16. The valve 32 of the core rod is closed so that no plastic can enter the inside of the core rod and the injected plastic contacts with the circumference of the core rod which is extending into the cavity 96 and also with the wall of the cavity.

In accordance with conventional practice, the plasticizer 94 supplies the motion plastic 90 to the cavity 96 at extremely high pressure so as to quickly and thoroughly fill the entire cavity around the core rod. There is then a reduction in pressure and this is followed by a "suck back" during which time a negative pressure is applied so as to withdraw the molten material from the runner 94. In conventional injection molding, the initial cooling of the plastic 90 in the injection mold causes the plastic to shrink and move away from the wall of the mold cavity. This reduces the further cooling of the plastic since the plastic contacts only lightly or not at all with the cavity wall which is cooled by the circulation of cooling fluid through chambers 98 in the wall of the mold.

With this invention, the valve 32 is opened when the pressure in the mold cavity is reduced and preferably during the suck back period when there is negative pressure on the plastic 90 in the injection mold cavity.

FIG. 5 shows the valve 32 open so that air can flow across the seat 34 and fill the interior of the parison which is indicated in FIG. 5 by the reference character 100. This air pressure within the parison causes any shrinkage of the parison to be in a direction away from the core rod 16 and the parison remains in contact with the cavity wall through which heat flows from the parison to the cooling chambers in the wall.

This reduces the heating of the core rod 16 by the hot plastic of the parison 100. This reduced heat buildup in the core rods permits the injection blow molding apparatus to be operated with a shorter cycle and higher production even though no additional means are provided for cooling the core rods faster. There is not as much heat to be removed, as formerly.

The clearance, indicated by the reference character 102 in FIG. 5, is exaggerated for purposes of illustration. It will be apparent that when the core rod 16 is lifted out of the injection mold, the parison 100 will be again in contact with the top of the core rod since it is supported by the core rod; but as the core rod and parison move into the blowing mold, the parison is loose on the core rod and there is no danger of any localized sticking which could interfere with the blowing of the parison to a uniform wall thickness.

FIG. 6 shows the way in which the parison 100' separates from the core rod 16' progressively during the blowing of the parison in a blowing mold 106. Air under pressure flowing around the open valve 32' inflates the end portion of the parison into contact with the cavity wall of the blow mold, as indicated by the reference character 108.

The shrinkage of the parison 100' into tight engagement with the core rod interferes with even blowing of the parison and if the core rod is so hot that the parison sticks, the blowing is more uneven. The parison tends to blow to a thinner section 110 at regions where the parison is not in contact with the cavity wall 108 and where the release of additional plastic material is retarded by sticking of the plastic to the core rod 16'. As the blown portion of the parison is forced to the right and pulled loose from the core rod, there is a tendency for the plastic to push into a roll 112 of increased thickness which may become cumulative, depending upon the amount of sticking; and which may result in substantial localized variations in thickness if the sticking of the parison to the core rod is of different degree at different places along the core rod length. This invention brings the parison to the blowing mold loose on the core rod so that air can flow lengthwise along the core rod and expand the parison uniformly.

FIG. 2 shows the indexing head 18 in dotted lines in its raised position which it occupies when making its intermittent angular movements to change core rods from one operational station to another. The indexing head is shown in its lowered position in full lines with the air pipe 50 extending into the passage 52; and with the shaft 66 located under the passage 62. FIG. 2 also shows one of the positioning pins 120 which extends upwardly from the fixed frame 122 of the blow molding apparatus. There are six positioning pins 120 in the blow molding apparatus shown in FIG. 1, but these are merely conventional precautions on certain blow molding machines and they form no part of the present invention.

The air pipe 50 extends downwardly through the fixed frame 122 of the blow molding apparatus and its lower end communicates with a blow control 126 which is equipped with a programmed valve for supplying air to the air pipe 50 at the time that the plasticizer reduces the pressure in the injection mold and more particularly during the suck back of plastic and the negative pressure on the plastic in the injection mold cavity, as previously explained.

The preferred embodiment of the invention has been illustrated and described, but changes and modifications can be made, and some features can be used in different combinations without departing from the invention as defined in the claims.

What is claimed is:

1. Injection blow molding apparatus including an injection mold, a blowing mold, core rods to which a parison is applied in the injection mold, a core rod indexing support movable to transfer the core rods from the injection mold to the blowing mold, each of the core rods having a valve operable to control flow of air from within the core rod to the inside surface of the parison to blow the parison, means for operating the core rod valves when the core rods are located in the blowing mold, and means for operating the core rod valves when the core rods are in the injection mold so as to partially expand the parison into contact with the injection mold and spaced from the core rod, means operable to suck back thermoplastic from the injection mold after injection molding, and said means for operating the core rod valves at the injection mold provides air to the inside of the parison after said means to suck back thermoplastic material from the injection mold is actuated so that a negative pressure is applied to the outside of the parison, and a positive pressure is applied to the inside of the parison in the injection mold to provide the partially expanded parison, whereby said indexing support is operable to transfer the partially expanded parison from the injection mold to the blowing mold for final blowing.

2. The injection blow molding apparatus described in claim 1 characterized by the valve of each core rod being located at the end of the core rod remote from the core rod support, and motion-transmitting means extending lengthwise of the core rod and within the core rod for transmitting motion from the core rod support to the valve at the end of the core rod remote from the support.

3. The injection blow molding apparatus described in claim 1 characterized by the valve in each core rod being at the end of the core rod remote from the support, a shaft in each core rod extending from the valve and through the core rod into the core rod support, an actuator under the core rod support at each of the injection mold and blowing mold positions at which the support stops when moving the core rods to the different molds, and motion-transmitting means in the core rod support for transmitting motion from the actuators to the core rod shafts that open the valves, said actuators, motion-transmitting means and shafts constituting mechanisms for operating the core rod valves when the core rods are in the injection mold and in the blowing mold.

4. The injection blow molding apparatus described in claim 3 characterized by the motion-transmitting means being carried by the indexing core rod support and movable with the core rod support as said core rod support moves angularly to shift core rods from the location of one mold to the next mold, and the actuators being at fixed locations under the indexing core rod support and with respect to which the indexing core rod support moves parallel to its axis of rotation as the indexing core rod support raises core rods and lowers them at successive stations at which the indexing core rod support stops during the operation of the apparatus.

5. The apparatus of claim 1, said means to suck back thermoplastic material from the injection mold comprising a plasticizer having a nozzle communicating with the injection mold.

6. The apparatus of claim 5, further comprising a runner disposed between said nozzle and communicating with the injection mold cavity, said means to suck back thermoplastic material comprising means to remove thermoplastic material from the runner.

* * * * *